Feb. 23, 1943.    E. D. COLEMAN    2,311,977
ION ACTIVITY MEASUREMENT DEVICE
Original Filed Jan. 20, 1939
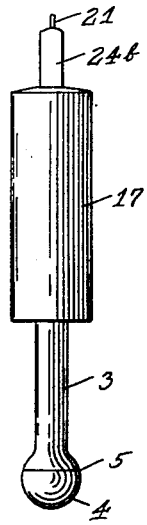
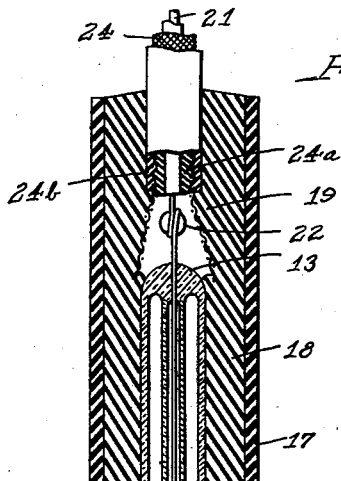
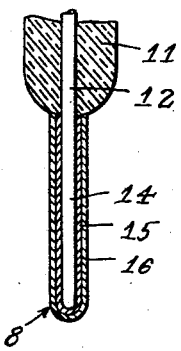
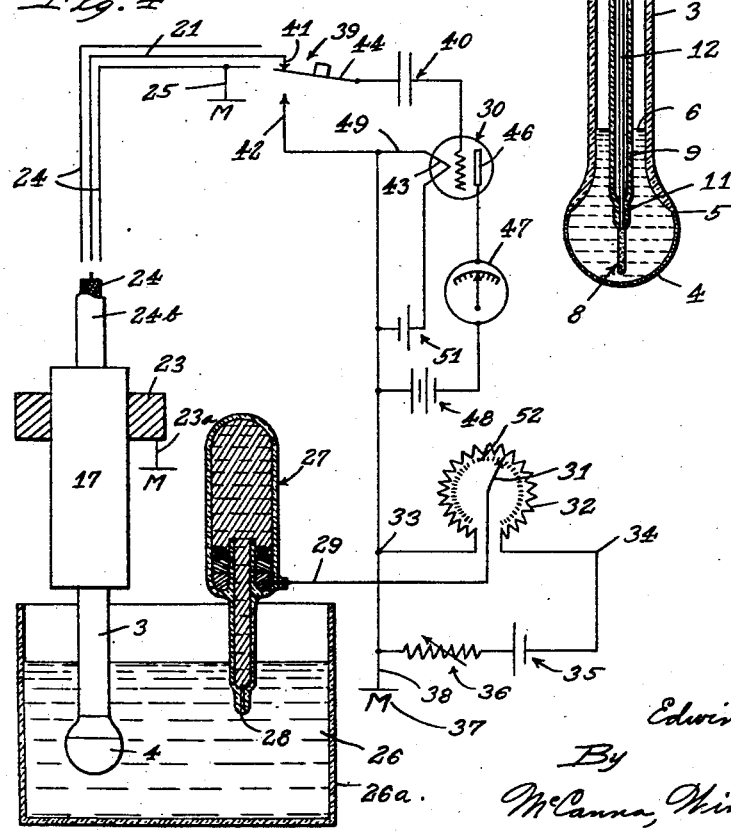
Inventor:
Edwin D. Coleman
By
McCanna, Winterborn & Morebach
Attys.

Patented Feb. 23, 1943

2,311,977

UNITED STATES PATENT OFFICE 2,311,977

ION ACTIVITY MEASUREMENT DEVICE

Edwin D. Coleman, Maywood, Ill.

Original application January 20, 1939, Serial No. 251,975. Divided and this application February 8, 1940, Serial No. 317,806

5 Claims. (Cl. 175—183)

This invention relates to devices for the determination of ion activity, such, for example, as hydrogen ion concentration.

This is a division of my application entitled "Ion activity measurement device," filed January 20, 1939, Serial No. 251,975.

Until comparatively recent years the measurement of pH has been a laboratory procedure requiring that the measuring electrode such as the hydrogen electrode be made up just prior to the determination. The making up of this electrode required unusual skill. With the advent of the glass electrode this situation was somewhat improved, but there have still been many difficulties attendant upon common and routine use of pH equipment by comparatively unskilled operators. A common type of such electrodes is that known as the bulb electrode which consists of an outer electrode bulb partly filled with a solution commonly consisting of hydrochloric acid and quinhydrone into which dips an inner electrode. It has been the practice in the past to seal the electrode by means of a wax, closing the end of the electrode stem. Frequent difficulty has been experienced because of the instability of the solution within the electrode shell and due to changes in the electrode structure with time which introduced increasing errors. These failures of the bulb type glass electrodes may be attributed to a number of major causes, among which may be listed: (1) change in the composition of the solution with which the bulb is filled; (2) change in potential of the inner electrode; (3) electrical leakage between the inner electrode terminals and points at some other potential; (4) failure of the glass bulb, and (5) pseudo potentials on the electrode stem which show up at different depths of immersion. Another difficulty heretofore associated with glass electrodes of this type is that of leakage from or to the conductors leading from the glass electrode proper to the potential measuring device, and the necessity for extreme precaution to prevent such leakage.

An important object of the present invention is the provision of a glass electrode and ion measurement device which is free of these and other objectionable features and which embodies certain features of improved construction and composition.

Figure 1 is an elevation of a glass electrode embodying my invention;

Fig. 2 is an enlarged longitudinal section therethrough;

Fig. 3 is an enlarged section through the inner electrode, and

Fig. 4 is a wiring diagram of the complete measurement device.

According to one phase of the present invention, the electrode comprises a stem designated generally by the numeral 3, of high resistance glass, preferably lead glass having a coefficient of thermal expansion of about $9.2 \times 10^{-6}$ over the range 0–350° C., such as G12 made by Corning Glass Works, Corning, New York, and capable of being permanently fused and sealed to a low resistance glass bulb 4 as indicated at 5. The low resistance bulb 3 is preferably formed of glass of a composition about as follows:

| | Per cent |
|---|---|
| $SiO_2$ | 72 |
| $CaO$ | 6 |
| $Na_2O$ | 22 | one example of which is that known commercially as Corning 015. By constructing the outer shell in this manner, I obtain a highly improved result in eliminating the necessity of always immersing the electrode to a given depth in the solution under test. By using a high resistance stem in combination with a low resistance bulb, the pH sensitivity is substantially limited to the bulb portion of the shell and the depth of immersion is not critical so long as the bulb is covered. In the past ordinary soda glass has been used in the making of the stems in commercial production for the purpose of obtaining the desired resistance characteristics, and considerable difficulty has arisen due to breakage of the electrode at the junction between the bulb and the stem. In spite of all precautions it has been impossible to reduce the amount of this breakage to any substantial degree. I have found, however, that this can be substantially completely eliminated without impairing the functional characteristics of the electrode by the use of a lead glass such as described for the stem, and I am of the opinion that this breakage has in the past been due to a difference in the coefficient of expansion of the two pieces of glass fused together at this point. At least the difficulty seems to be remedied by employing a bulb and a stem which are within close limits of having the same coefficient of thermal expansion.

The bulb 4 and the lower end of the stem 3 are filled with a solution, in this instance consisting of two tenths normal hydrochloric acid which is saturated at 4° C. with potassium chloride and saturated at operating temperature with silver chloride. While I have stated that the solution is made from two tenths normal hydrochloric acid, and I prefer to keep it as close as possible to this concentration because of the better temperature correction thereby obtained as will presently be described, the critical range of concentration is from about one tenth normal to about three tenths normal hydrochloric acid.

The bulb and stem are filled with inner solution to about the level indicated at 6, leaving a space 7 above the liquid for expansion of the solution with temperature changes. An inner electrode 8 within the bulb 4 is immersed in the solution 6 and is carried in a glass tube 9 preferably of the above described lead glass, the electrode extending through the lower end of this tube as shown at 11 and sealed therein by fusion of the glass tube. A conductor 12 extends upward through the tube 9 and out through the upper end thereof. The upper end of the stem 3 and the tube 9 are fused and so sealed together as indicated at 13 to close the upper end of the stem 3 and of the tube 9 and also to seal the exit of the conductor 12 by fusion of the glass thereto. The inner electrode 8 is in this instance formed by making the conductor 12 of platinum and sealing the tube 9 thereto at a point spaced from the end of the conductor 12 so as to provide a projecting end 14 of platinum wire. This projecting end 14 is plated with a layer 15 of metallic silver, after which the silver plate is made anode in a chloride solution and chlorine deposited against the silver to react therewith and produce an outer layer of silver chloride, herein designated at 16. It will be understood that numerous different methods may be employed for producing this structure, the method above described being merely illustrative, the essential thing being to produce a coating of silver chloride on a silver electrode surface.

The composition of the inner electrode and of the inner solution is such that the potential with respect to the inner surface of the electrode shell will undergo the same increment with respect to temperature as will occur at the inner electrode at the same temperature increment. I have found by adopting the combination of inner electrode and inner solution above described that this can be caused to occur within reasonable temperature limits. I have also found that substantially the same result can be obtained by using a lead inner electrode and a solution consisting of hydrochloric acid containing lead chloride in the proper concentration. A mercury electrode may also be used immersed in a solution of chloride of mercury in hydrochloric acid solution.

It will be understood that the increment in potential at the point above described will not only be substantially equal, but will be in opposite directions with respect to an external point so that the potential between the inner electrode and the inner wall remains substantially constant with change in temperature.

The glass electrode proper is carried in a support, in this instance consisting of a tube 17 shown in the drawings as of insulation material, but which may also be of metal since its function is that of a guard ring, said tube concentric with the stem 3 of the electrode and spaced therefrom, the space between the tube 17 and the stem being filled with a thermo-plastic material 18, such as pitch, rosin, or other semi-insulating thermo-plastic material. The tube 17 preferably extends somewhat beyond the end of the electrode proper, and the space therein is likewise filled with the thermo-plastic material as shown at 19. Beyond the end of the electrode proper and within the thermo-plastic material 19, the end of the conductor 12 is electrically connected with a lead 21, as shown at 22.

Referring now more particularly to Fig. 4, in service the glass electrode is mounted in a frame or supporting structure herein generally indicated at 23, the element 23 cooperating with the tube 17 to support the electrode in the required position. The lead 21 is enclosed by a shield 24, surrounding and spaced therefrom, the shield consisting, in this instance, of a tube of braided wire, insulation 24a being positioned between the lead 21 and the inner surface of the shield 24. The outer surface of the shield is covered by a layer of rubber insulation 24b. The shield 24 extends into the end of the tube 17 and is held in position within the thermo-plastic material in the region 19. The end of the shield is preferably brought down into closely spaced relation with the upper end of the electrode proper so that the semi-insulation thermo-plastic material is excluded from the region between the upper end of the stem and the inner surface of the shield. This is preferable but not essential since the semi-insulation material in contact with the stem 3, between this point and the bulb, itself constitutes an effective guard ring preventing movement of electrons to the connection 21 and lead 12 along the outer surface of the electrode stem at the condition of balance. The shield 24 is connected as indicated at 25 to what is commonly called a McClure ground, herein designated by the letter M wherever it occurs. The support 23 for the glass electrode is also connected to McClure ground by a conductor 23a.

In service the shell of the glass electrode is immersed in a solution as indicated at 26, the hydrogen ion concentration of which it is sought to determine, carried in a vessel 26a, and a reference electrode designated generally by the numeral 27 is brought into electrical cooperative relation therewith at a liquid junction 28, this connection being made in any of the usual well known manners. The reference electrode, which may be an ordinary Calomel half cell, is connected by a conductor 29 to the slider 31 of a potentiometer circuit, designated by the slider 31 operating on a slide wire 32, having terminals 33 and 34 and being further connected in series with a battery 35 and a variable resistance 36. This potentiometer circuit may be standardized by any of the well known procedures, the standardizing circuit not being here indicated. Point 33 of the potentiometer circuit is also carried to the common McClure point, as indicated at 37 by a conductor 38. Now it will be noted that the potentiometer circuit has between the points 31 and 33 a potential due to the battery 35 which is opposite in sense to the potential developed by the cell, comprising the reference electrode 27 and the glass electrode, feeding conductor 21, which potential is impressed on the potentiometer circuit in a manner presently to be described. By properly adjusting the position of the slider 31 these two potentials can be made equal and opposite, in which instance the point 33 and the conductor 21 are at the same potential. There is also shown in Fig. 4 apparatus for determining when this condition of equality is attained by virtue of an impulse type amplifier, a device which will indicate any difference in potential between the cell and potentiometer and which will show no indication when the condition of equality is attained. This may also take the form of any well known type of potential detectors, such as the D'Arsonval galvanometer, plate electrometer, or the like.

The device for detecting the point of potential equality between the cell chain and the potentiometer includes a two point switch 39 having a terminal 41 connected to conductor 21 and terminal 42 connected to the potentiometer slide wire 32 at 33. Terminal 42 further connects to the cathode 43 of a vacuum tube indicated generally by the numeral 30. The switch 39 has a blade 44 movable to establish contact with either of the terminals 41 or 42 as required, and is in turn continuously connected to a condenser 40 which is in turn connected to the grid 45 of the same vacuum tube. The plate 46 of said vacuum tube connects through meter 47 and B batteries 48 to the cathode 43 and by conductor 49 to the point 33 of the potentiometer circuit. The filament of said vacuum tube is excited by an A battery 51.

In practice the blade 44 of switch 39 is moved from the position of rest in contact with terminal 42 into contact with terminal 41 and at the same time the operator observes the action on meter 47. Now if there exists any difference in potential between terminals 41 and 42 there will occur a movement of the needle of meter 47, the direction and magnitude of this needle movement indicating how far and in which direction the potentiometer is out of balance. The operator subsequently moves slider 31 toward the position of balance as thus indicated and again checks by moving switch blade 44 from contact 42 to contact 41, repeating adjustments of the potentiometer slider 31 until the condition of equality is reached whereat points 42 and 41 are at the same potential and no movement of the meter needle occurs when switch blade 44 is moved alternately between terminals 42 and 41. At this point of equality the potential developed in the potentiometer circuit is equal and opposite to that of the cell consisting of the reference electrode and the glass electrode. The usual calibrations 52 on the potentiometer slider wire then indicate either the potential of the cell or the pH of the solution being tested, depending upon the units in which the scale is calibrated.

Now it will be noted that at the condition of equality conductors 21 and the point 33 are at the same potential. Further shield 24 is at this same potential since the shield and the point 33 are both at McClure potential. Further, the support 23 for sleeve 17 is also at McClure potential. As a result of this unique construction, it is impossible for leakage to occur from the conductor 21, since it is exposed at no point to potentials other than McClure. By utilizing such construction it is not necessary to employ high insulation between the conductor and the shield 24, since current cannot flow unless difference of potential exists.

While I have herein shown one form of device for measuring the potential between the reference electrode conductor 29 and the glass electrode conductor 21, the measuring device shown in Figure 1 of my copending application Serial No. 252,779, filed January 25, 1939, may also be used.

The above described construction substantially eliminates the difficulties heretofore associated with glass electrodes of the bulb type as has been shown through prolonged investigation and extensive use in the field. I have discovered that the reason for the depreciation of prior art electrodes is in part found in the manner in which the electrode stem was sealed. These are commonly sealed with a wax-like substance, such as shellac, petroleum pitches or sealing wax, and that while electrodes made in this manner operate satisfactorily for a short period of time, the nature of the seal soon introduces inaccuracies in the result for the reason, first, that all of these pitches contain more or less water soluble constituents that are eventually dissolved in the inner solution, resulting in a change in the chemical composition and frequently also causing a material change in the potential of the inner electrode; secondly, when wax or pitch to glass surfaces are exposed to the inner solution for extended periods, the pitch becomes saturated with a fluid of different chemical composition than the inner solution. Consequently, if the inner electrode or any metal electrically connected to the inner electrode is allowed to contact the saturated sealing material, a potential is established and galvanic action occurs between this region of contact and the inner electrode proper, these points forming the two electrodes of a galvanic cell short circuited by the inner electrode. The galvanic action results in eventual failure of the inner electrode; thirdly, the saturated sealing compound tends to separate from the glass allowing a thin film of the inner solution to follow along the region of separation and establish electrical contact with points outside the electrode bulb which points may be at other potentials. Under these circumstances a very large error occurs. Change in potential of the inner electrode may result from one of two reasons: first, residual gases within the sealed bulb may cause the formation of surface films on the electrode which have a different potential from that of the original surface itself. The formation of lead oxide over lead is an example; second, the character of the solution itself may alter causing the inner electrode potential to undergo a concurrent change. For example, if quinhydrone is employed, change in the quinone to hydroquinone will cause a change of potential of the inner electrode without a concurrent change at the inner surface of the glass bulb.

On the other hand, with my improved construction the conductor 12 is completely insulated from the inner solution 6 at all points, and at the same time the solution is hermetically sealed in place, in glass, and cannot evaporate, become contaminated or cause conductance between the inside and outside of the bulb by other than the desired path through the bulb 4. The metal-to-glass seals are permanent. The solution is sealed against air so that there is no oxidation or other chemical action on the solution.

While I have described the electrode as being a glass electrode, it is known that materials other than glass, for example, quartz and wax also exhibit substantially the same potential response to pH as does glass, and in the use of the term glass as applied to certain phases of this application, I refer to any material other than glass which may be used for this purpose.

I claim:

1. The combination in a potential measurement device of the type in which a source of potential may be located at a remote point from a measuring means of a high impedance source of potential, a potentiometer circuit for measuring the potential thereof, means for insulating the potential source, a conductor connecting the potential source with said potentiometer circuit, an electrostatic shield for said conductor insulated therefrom, and means for connecting one side of the potentiometer circuit to said shield to maintain said shield and said conductor at the same potential at the instant of measurement.

2. The combination in an ion activity measurement device of the type in which a source of potential may be located at a remote point from a measuring means of a high impedance source comprising an electrode having a stem, a measuring means for measuring the potential thereof adapted to be remotely placed with respect to said electrode, a lead connecting said electrode and said measuring means, means receiving said stem for mounting said electrode, an electrostatic shield for said lead insulated therefrom and connected to said mounting, and means for maintaining said mounting, said shield, and said lead at the same potential at the instant of measurement.

3. The combination in a potential measurement device of a glass electrode comprising an electrode proper having a stem, an electrode mounting sleeve around said stem, insulation material interposed between said stem and sleeve for mounting the stem therein, a measuring means, a lead connecting said stem and said measuring means, an electrostatic shield enclosing said lead and insulated therefrom having one end embedded in said insulation material and enclosing said lead within said mounting sleeve, and means for maintaining said shield and said lead at the same potential at the instant of measurement.

4. The combination in a potential measurement device of the type in which a source of potential may be located at a remote point from a measuring means, of a high impedance source of potential, a measuring circuit for measuring the potential thereof, means for insulating the potential source, a conductor connecting the potential source with said measuring circuit, an electro-static shield for said conductor insulated therefrom, and means including a potential source for maintaining said shield and said conductor at the same potential at the instant of measurement.

5. The combination in a potential measurement device of a glass electrode including a stem and a conductor extending therefrom, an electrode mounting sleeve around said stem, semi-insulation material interposed between said stem and sleeve for mounting the stem therein, a measuring means, a lead connecting said conductor and said measuring means, and means for maintaining said semi-insulation material and said lead at the same potential at the instant of measurement.

EDWIN D. COLEMAN.